United States Patent
Terao et al.

(10) Patent No.: US 7,548,298 B2
(45) Date of Patent: Jun. 16, 2009

(54) LIQUID CRYSTAL PANEL, METHOD FOR PRODUCING LIQUID CRYSTAL PANEL, AND ELECTRONIC APPARATUS

(75) Inventors: Koichi Terao, Suwa (JP); Yuji Shinohara, Suwa (JP); Tomoko Sasabayashi, Suwa (JP); Keipin Cho, Chino (JP)

(73) Assignee: Seiko Epson Corporation (JP)

( * ) Notice: Subject to any disclaimer, the term of this patent is extended or adjusted under 35 U.S.C. 154(b) by 474 days.

(21) Appl. No.: 11/467,299

(22) Filed: Aug. 25, 2006

(65) Prior Publication Data

US 2007/0085954 A1 Apr. 19, 2007

(30) Foreign Application Priority Data

Oct. 13, 2005 (JP) ............................. 2005-298463

(51) Int. Cl.
*G02F 1/1339* (2006.01)
(52) U.S. Cl. .................... 349/153; 349/125; 349/190
(58) Field of Classification Search .................. 349/125
See application file for complete search history.

(56) References Cited

U.S. PATENT DOCUMENTS 6,323,924 B1 * 11/2001 Matsuoka et al. ........... 349/122
6,816,219 B2 * 11/2004 Akagi et al. ................. 349/125

FOREIGN PATENT DOCUMENTS

| JP | 51-110349 | 9/1976 |
|----|-----------|--------|
| JP | 58-102924 | 6/1983 |
| JP | 59-144617 | 9/1984 |
| JP | 05-203958 | 8/1993 |
| JP | 2001-089568 | 4/2001 |
| JP | 2002-350874 | 12/2002 |

\* cited by examiner

*Primary Examiner*—Richard H Kim
(74) *Attorney, Agent, or Firm*—Harness, Dickey & Pierce, P.L.C.

(57) ABSTRACT

A liquid crystal panel includes: a pair of substrates; inorganic oriented films having plural fine pores being provided on surfaces of the substrates facing each other; a liquid crystal layer being provided between the inorganic oriented films; and a sealing part sealing the liquid crystal layer, the sealing part being provided between the inorganic oriented films and along an outer periphery of the inorganic oriented films, the liquid crystal panel further including a filling material including a compound having a first functional group having high affinity with the inorganic oriented films and a second functional group having high affinity with the sealing part, the filling material being filled in an area of the inorganic oriented films overlapping the sealing part to fill the fine pores and to covers surfaces of the inorganic oriented films.

12 Claims, 5 Drawing Sheets

LIQUID CRYSTAL PANEL, METHOD FOR PRODUCING LIQUID CRYSTAL PANEL, AND ELECTRONIC APPARATUS

BACKGROUND

1. Technical Field

The present invention relates to a liquid crystal panel, a method for producing a liquid crystal panel, and an electronic apparatus.

2. Related Art

In recent years, a vertically oriented liquid crystal display device (liquid crystal panel) is being put into practical applications as a liquid crystal television (direct view type display device) and a liquid crystal projector (projection type display device).

As a vertically oriented film used in the vertically oriented liquid crystal display device, such as a liquid crystal television, an organic oriented film, such as polyimide, is used. An inorganic oriented film is often used in a liquid crystal projector.

Various investigations have been made for a sealing structure and a sealing material of a liquid crystal panel (as described, for example, in JP-A-2002-350874 and JP-A-2001-89568).

However, an adhesive containing an organic material as a major component is used as the sealing material, and therefore, in the case where an inorganic oriented film is used as an oriented film, the sealing material is low in adhesion strength and adhesion property with the oriented film, and water or the like is liable to invade from the interface between them. When water invades the liquid crystal layer, the liquid crystal molecules are altered and deteriorated, and as a result, such a problem arises that display failure occurs on the liquid crystal panel.

SUMMARY

An advantage of some aspects of the invention is to provide a liquid crystal panel excellent in durability, a method for producing the liquid crystal panel, and an electronic apparatus.

According to an aspect of the invention, a liquid crystal panel includes:

a pair of substrates;

inorganic oriented films having plural fine pores being provided on surfaces of the substrates facing each other;

a liquid crystal layer being provided between the inorganic oriented films; and a sealing part sealing the liquid crystal layer, the sealing part being provided between the inorganic oriented films and along an outer periphery of the inorganic oriented films, the liquid crystal panel further including a filling material including a compound having a first functional group having high affinity with the inorganic oriented films and a second functional group having high affinity with the sealing part, the filling material being filled in an area of the inorganic oriented films overlapping the sealing part to fill the fine pores and to covers surfaces of the inorganic oriented films.

According to the aspect of the invention, water can be prevented from invading from the interface between the sealing part and the inorganic oriented films and through the fine pores of the inorganic oriented films, whereby a liquid crystal panel excellent in durability can be obtained.

It is preferred in the liquid crystal panel the aspect of the invention that the first functional group is a group forming a covalent bond with the inorganic oriented films.

According to the preferred embodiment, the adhesion property between the inorganic oriented films and the sealing part through the filling material can be further improved.

It is preferred in the liquid crystal panel of the aspect of the invention that the inorganic oriented film is constituted by $SiO_2$ or $Al_2O_3$ as a major component, and the first functional group is an alkylsilyl group or a hydroxyl group.

These functional groups have high reactivity with a hydroxyl group present in the inorganic oriented film and are capable of improving the adhesion property between the filling material and the inorganic oriented films.

It is preferred in the liquid crystal panel of the aspect of the invention that the inorganic oriented film is an obliquely vapor-deposited film.

The inorganic oriented film of an obliquely vapor-deposited film particularly has fine pores in a high density, and upon applying the invention to a Liquid crystal panel equipped with the inorganic oriented film, the invasion preventing effect of water into the liquid crystal layer is significantly exerted.

It is preferred in the liquid crystal panel of the aspect of the invention that the second functional group is a group forming a covalent bond with the sealing part.

According to the preferred embodiment, the adhesion property between the inorganic oriented films and the sealing part through the filling material can be further improved.

It is preferred in the liquid crystal panel of the aspect of the invention that the sealing part is constituted by a resin material having a polymerizable group as a major component, and the second functional group is a group being polymerized with the polymerizable group.

According to the preferred embodiment, the adhesion property between the filling material and the sealing part can be improved.

It is preferred in the liquid crystal panel of the aspect of the invention that a content of the compound in the filling material is 50% by weight or more.

By using the compound in the filling material in a content (content ratio) in the range, sufficient adhesion property between the sealing part and the filling material can be obtained irrespective to the kind of the constitutional material of the sealing part and the kind of the compound.

It is preferred in the liquid crystal panel of the aspect of the invention that the compound has an average molecular weight of from 100 to 500.

The compound having a molecular weight in the range is in a liquid state at ordinary temperature or in a liquid state at a relatively low temperature, and therefore, it is easy to handle and is high in solubility in various kinds of solvents. Accordingly, preparation of a filling material composition used in the production process of the liquid crystal panel, and its handling are facilitated.

According to another aspect of the invention, a method for producing a liquid crystal panel including a pair of substrates; inorganic oriented films having plural fine pores being provided on surfaces of the substrates facing each other; a liquid crystal layer being provided between the inorganic oriented films; and a sealing part sealing the liquid crystal layer, the sealing part being provided between the inorganic oriented films and along an outer periphery of the inorganic oriented films, includes the steps of:

preparing a pair of substrates each having on one surface thereof the inorganic oriented film;

filling a filling material including a compound having a first functional group having high affinity with the inorganic oriented films and a second functional group having high affinity with the sealing part, in an outer periphery of the inorganic oriented films to fill the fine pores and to covers surfaces of the inorganic oriented films;

feeding a sealing material in a liquid state forming the sealing part to an area of the inorganic oriented films having been filled with the filling material;

hardening the sealing material after disposing the pair of substrate with a gap therebetween to make the sealing materials in contact with each other;

forming the liquid crystal layer by injecting a liquid crystal composition into the gap; and sealing an injection inlet having been used for injecting the liquid crystal composition.

According to the aspect of the invention, such a liquid crystal panel can be produced that water can be prevented from invading from the interface between the sealing part and the inorganic oriented films and through the fine pores of the inorganic oriented films, and in other words, a liquid crystal panel excellent in durability can be produced.

It is preferred in the production method of a liquid crystal panel of the aspect of the invention that the step of filling the filling material is carried out by feeding a filling material composition containing the filling material to the inorganic oriented films.

By using the method of the preferred embodiment, i.e., a liquid phase process, the filling rate of the filling material to the fine pores can be further improved.

It is preferred in the production method of a liquid crystal panel of the aspect of the invention that the filling material composition has a viscosity that is lower than a viscosity of the sealing material.

According to the preferred embodiment, a sufficient amount of the filling material can be filled more deeply in the fine pores of the inorganic oriented film.

According to still another aspect of the invention, an electronic apparatus includes the liquid crystal panel of the aspect of the invention.

According to the aspect of the invention, an electronic apparatus having high reliability can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

The liquid crystal panel, the method for producing a liquid crystal panel, and an electronic apparatus according to the invention will be described in detail with reference to the drawings.

Figure 1:
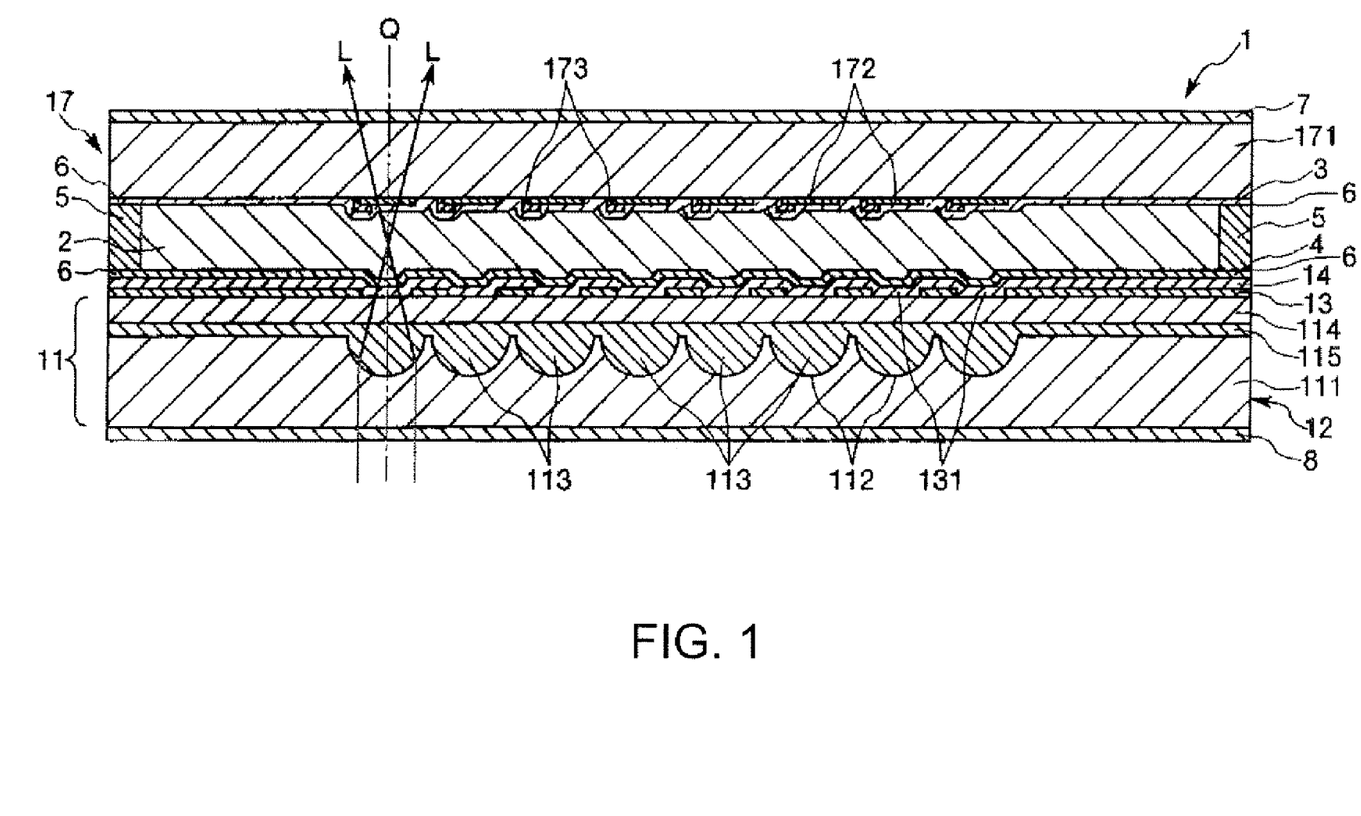
FIG. 1 is a vertical cross sectional view schematically showing an embodiment of the liquid crystal panel according to the invention.
Figure 2:
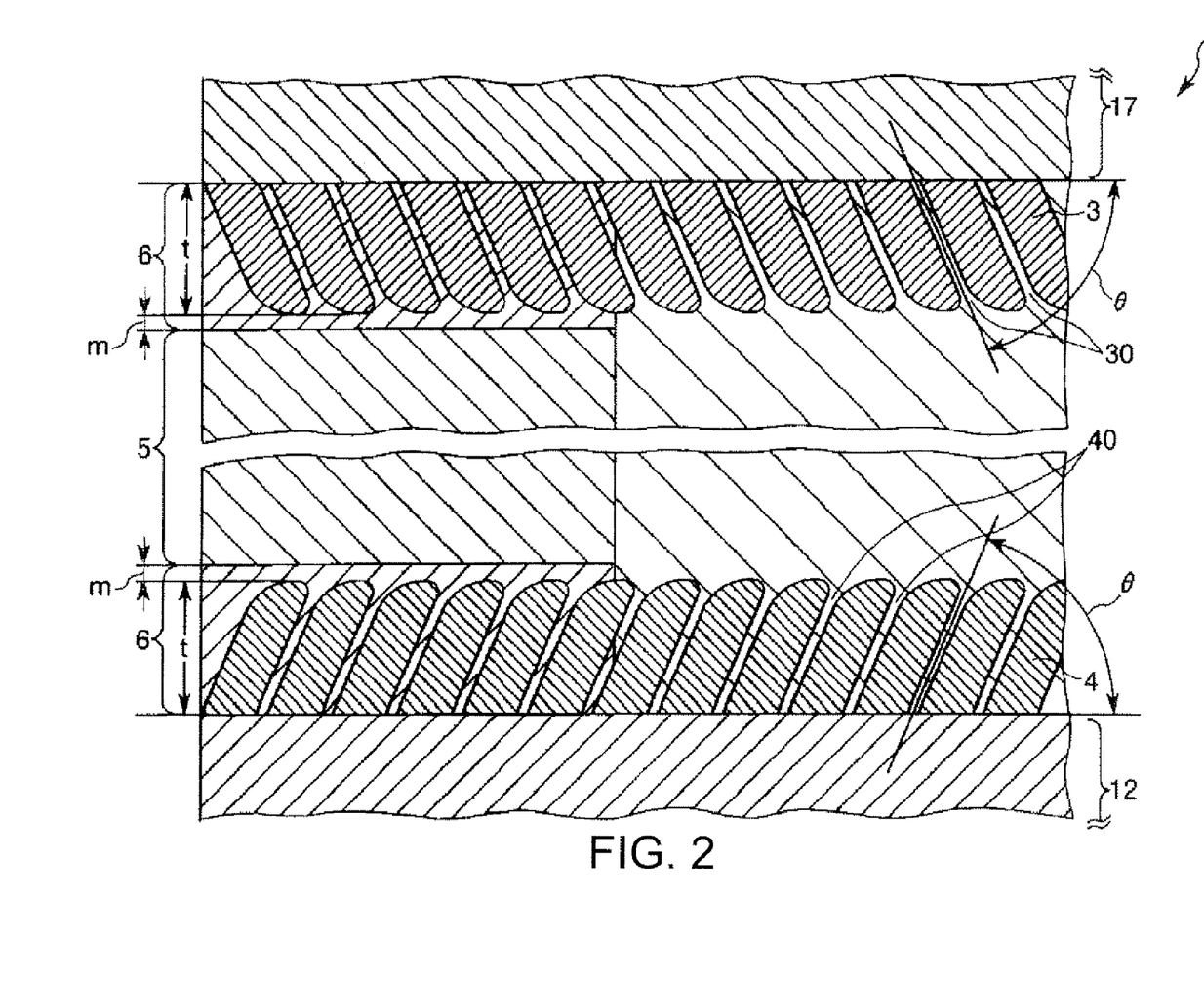
FIG. 2 is an enlarged vertical cross sectional view showing a part in the vicinity of the outer periphery of the liquid crystal panel shown in FIG. 1.

FIG. 1 is a vertical cross sectional view schematically showing an embodiment of the liquid crystal panel according to the invention, and FIG. 2 is an enlarged vertical cross sectional view showing a part in the vicinity of the outer periphery of the liquid crystal panel shown in FIG. 1. In FIG. 1, wiring and the like are omitted from the illustration. In the following description, the upper side in FIGS. 1 and 2 is referred to as "upper side" or the like, and the lower side therein is referred to as "lower side" or the like.

The liquid crystal panel (TFT liquid crystal panel) 1 shown in FIG. 1 has a TFT substrate (liquid crystal driving substrate) 17, an inorganic oriented film 3 bonded to the TFT substrate 17, a counter substrate 12 for a liquid crystal panel, an inorganic oriented film 4 bonded to the counter substrate 12 for a liquid crystal panel, a liquid crystal layer 2 containing liquid crystal molecules filled in a gap between the inorganic oriented film 3 and the inorganic oriented film 4, a sealing part 5 provided on an outer periphery of the liquid crystal panel 1, a polarizing film 7 bonded to the outer surface (upper side) of the TFT substrate (liquid crystal driving substrate) 17, and a polarizing film 8 bonded to the outer surface (lower side) of the counter substrate 12 for a liquid crystal panel.

The counter substrate 12 for a liquid crystal panel has a microlens substrate 11, a black matrix 13 having openings 131 and being provided on a surface layer 114 of the microlens substrate 11, and a transparent conductive film (common electrode) 14 provided on the surface layer 114 to cover the black matrix 13.

The microlens substrate 11 has a substrate 111 with concave parts for microlenses having plural (a large number of) concave parts (concave parts for microlenses) 112 each having a concave curved surface, and a surface layer 114 bonded to the surface of the substrate 111 with concave parts for microlenses, on which the concave parts 112 are provided, through a resin layer (adhesive layer) 115.

In the resin layer 115, microlenses 113 are formed with the resin filled in the concave parts 112.

The substrate 111 with concave parts for microlenses is produced from a mother material in a flat plate form (transparent substrate), and plural (a large number of) concave parts 112 are formed on the surface thereof.

The concave parts 112 can be formed, for example, by a dry etching method or a wet etching method, using a mask.

The substrate 111 with concave parts for microlenses is constituted, for example, by glass.

The mother material preferably has such a thermal expansion coefficient that is substantially equal to the thermal expansion coefficient of a glass substrate 171 (for example, the ratio of the thermal expansion coefficients thereof is about from 1/10 to 10). According to the constitution, the resulting liquid crystal panel 1 is prevented from suffering warpage, deflection and separation caused by temperature change due to difference in thermal expansion coefficient between them.

Taking the aforementioned standpoint into consideration, the substrate 111 with concave parts for microlenses and the glass substrate 171 are preferably constituted by the same material. According to the constitution, the liquid crystal panel 1 is effectively prevented from suffering warpage, deflection and separation caused by temperature change due to difference in thermal expansion coefficient between them.

In particular, quartz glass, characteristics of which are hard to change depending on environments upon production, is preferably used as the TFT substrate 17 described later in detail. Accordingly, the substrate 111 with concave parts for microlenses is preferably constituted by quartz glass corresponding thereto. According to the constitution, such a liquid crystal panel 1 can be obtained that is excellent in stability without warpage, deflection and the like.

The resin layer (adhesive layer) 115 covering the concave parts 112 is provided on the upper surface of the substrate 111 with concave parts for microlenses.

The constitutional material of the resin layer 115 is filled in the concave parts 112 to form the microlenses 113

The resin layer 115 may be constituted, for example, by a resin (adhesive) having a refractive index higher than the refractive index of the constitutional material of the substrate 111 with concave parts for microlenses, and for example, may be preferably constituted by an ultraviolet ray-curable resin, such as an acrylic resin, an epoxy resin and an acrylic epoxy resin.

The surface layer 114 in a flat plate form is provided on the upper surface of the resin layer 115.

The surface layer (glass layer) 114 may be constituted, for example, by glass. It is preferred in this case that the surface layer 114 has such a thermal expansion coefficient that is substantially equal to the thermal expansion coefficient of the substrate 111 with concave parts for microlenses (for example, the ratio of the thermal expansion coefficients thereof is about from 1/10 to 10). According to the constitution, warpage, deflection, separation, and the like caused by difference in thermal expansion coefficient between the substrate 111 with concave parts for microlenses and the surface layer 114 can be prevented from occurring. The advantage can be obtained further effectively by constituting the substrate 111 with concave parts for microlenses and the surface layer 114 by the same material.

The surface layer 114 generally has an average thickness of about from 5 to 1,000 µm from the standpoint of obtaining the necessary optical characteristics, and more preferably about from 10 to 150 µm.

The surface layer (barrier layer) 114 may also be constituted, for example, by ceramics. Examples of the ceramics include nitride ceramics, such as AlN, SiN, TiN and BN, oxide ceramics, such as $Al_2O_3$ and $TiO_2$, and carbide ceramics, such as WC, TiC, ZrC and TaC.

In the case where the surface layer 114 is constituted by ceramics, the average thickness of the surface layer 114 is preferably about from 20 nm to 20 µm, and more preferably from 40 nm to 1 µm, while not particularly limited.

The surface layer 114 may be omitted depending on necessity.

The black matrix 13 has a light shielding function and is constituted, for example, by a metal, such as Cr, Al, an Al alloy, Ni, Zn and Ti, or a resin having carbon or titanium dispersed therein.

The transparent conductive film 14 has electroconductivity and is constituted, for example, by indium tin oxide (ITO), indium oxide (IO) or tin oxide ($SnO_2$).

The TFT substrate 17 is a substrate for driving (controlling in orientation) the liquid crystal molecules contained in the liquid crystal layer 2, and has a glass substrate 171, plural (a large number of) pixel electrodes 172 disposed in a matrix form on the glass substrate 171, and plural (a large number of) thin film transistors (TFT) 173 corresponding to the pixel electrodes 172, respectively.

The glass substrate 171 is preferably constituted by quartz glass because of the reasons having been described.

The pixel electrode 172 drives the liquid crystal molecules in the liquid crystal layer 2 by performing charging and discharging with the transparent conductive film (common electrode) 14. The pixel electrode 172 is constituted, for example, by the same material as the transparent conductive film 14.

The thin film transistor 173 is connected to the corresponding pixel electrode 172 in the vicinity thereof. The thin film transistor 173 is also connected to a control circuit, which is not shown in the figures, to control an electric current fed to the pixel electrode 172. According to the constitution, charging and discharging of the pixel electrode 172 is controlled.

A polarizing film (polarizing plate or polarizing film) 7 is disposed on the outer surface (on the upper surface in FIG. 1) of the TFT substrate 17. Similarly, a polarizing film (polarizing plate or polarizing film) 8 is disposed on the outer surface (on the lower surface in FIG. 1) of the counter substrate 12 for a liquid crystal panel.

Examples of the material constituting the polarizing films 7 and 8 include polyvinyl alcohol (PVA). Polyvinyl alcohol doped with iodine may also be used as the polarizing films.

As the polarizing films, a film constituted by the aforementioned materials having been unidirectionally stretched may also be used.

By disposing the polarizing films 7 and 8, the light transmittance can be certainly controlled by adjusting the electrification amount.

The orientation directions of the polarizing films 7 and 8 are generally determined depending on the orientation directions of the inorganic oriented films 3 and 4 (upon application of a voltage in the embodiment).

The TFT substrate 17 is provided with the inorganic oriented film 3 as being bonded to the pixel electrodes 172, and the counter substrate 12 for a liquid crystal panel is provided with the inorganic oriented film 4 as being bonded to the transparent conductive film 14.

In the embodiment, the TFT substrate 17 and the inorganic oriented film 3 constitute the first substrate for an electronic device, and the counter substrate 12 for a liquid crystal device and the inorganic oriented film 4 constitute the second substrate for an electronic device.

The liquid crystal layer 2 is inserted (provided) between the inorganic oriented film 3 and the inorganic oriented film 4. The liquid crystal layer 2 contains liquid crystal molecules (liquid crystal material), and the orientation of the liquid crystal molecules is changed corresponding to charging and discharging of the pixel electrodes 172.

Examples of the liquid crystal molecule include a phenylcyclohexane derivative, a biphenyl derivative, a biphenylcyclohexane derivative, a terphenyl derivative, a phenylether derivative, a phenylester derivative, a bicyclohexane derivative, an azomethine derivative, an azoxy derivative, a pyrimidine derivative, a dioxane derivative and a cubane derivative, and also include these derivatives having a fluorine substituent, such as a fluoro group, a trifluoromethyl group, a trifluoromethoxy group and a difluoromethoxy group, introduced therein.

In the case where inorganic oriented films 3 and 4 are used, the liquid crystal molecules are liable to be oriented vertically as described later, and examples of a liquid crystal molecule suitable for vertical orientation include the compounds represented by the following formulae (1) to (3):

wherein rings A to I each independently represents a cyclohexane ring or a benzene ring; $R^1$ to $R^6$ each independently represents an alkyl group, an alkoxy group or a fluorine atom, and $X^1$ to $X^{18}$ each independently represents a hydrogen atom or a fluorine atom.

The inorganic oriented films (vertically oriented films) 3 and 4 have a function of regulating the orientation state of the liquid crystal molecules contained in the liquid crystal layer 2.

The constitution of the inorganic orientated films 3 and 4 will be described in detail later.

In the liquid crystal panel 1, one microlens 113, one opening 131 of the black matrix 13 corresponding to the optical axis Q of the microlens 113, one pixel electrode 172 and one thin film transistor 173 connected to the pixel electrode 172 correspond to one pixel.

The incident light L incident from the side of the counter substrate 12 for a liquid crystal panel passes through the substrate 111 with concave parts for microlenses, and further passes through the resin layer 115, the surface layer 114, the openings 131 of the black matrix 13, the transparent conductive film 14, the liquid crystal layer 2, the pixel electrodes 172 and the glass substrate 171 while being condensed upon passing through the microlenses 113.

The incident light L becomes linear polarized light when the incident light L passes through the liquid crystal layer 2, owing to the polarizing film 8 provided on the incident side of the microlens substrate 11.

The polarizing direction of the incident light L is controlled corresponding to the orientation state of the liquid crystal molecules in the liquid crystal layer 2. Accordingly, the incident light L having passed through the liquid crystal panel 1 is transmitted through the polarizing film 7, whereby the brightness of the outgoing light can be controlled.

Accordingly, the liquid crystal panel 1 has the microlenses 113, and furthermore, the incident light L passing through the microlenses 113 is concentrated and transmitted through the openings 131 of the black matrix 13.

The incident light L is shielded at the part of the black matrix 13 where the opening 131 is not provided. In the liquid crystal panel 1, accordingly, unnecessary light is prevented from being leaked from the part other than the pixels, and also the incident light L is prevented from being attenuated in the pixel part. Consequently, the liquid crystal panel 1 has a high transmittance of light in the pixel part.

The inorganic oriented films 3 and 4 have a structure including plural fine pores 30 and 40, respectively, and the axes of the fine pores 30 and 40 are unidirectionally oriented with inclination with respect to the upper surface (the surface, on which the inorganic oriented films 3 and 4 are provided) of the TFT substrate 17 (counter substrate 12 for a liquid crystal panel).

The state where the fine pores 30 and 40 are unidirectionally oriented means that the axes of the great majority of the fine pores 30 and 40 are directed to substantially the same direction (the average direction of the fine pores 30 and 40 is controlled), and the plural fine pores 30 and 40 may contain fine pores 30 and 40 having such axes that are directed to directions different from the great majority of them.

The inorganic oriented films 3 and 4 have a high structural regularity owing to the fine pores 30 and 40 regularly arranged.

According to the constitution, the liquid crystal molecules contained in the liquid crystal layer 2 are liable to undergo vertical orientation (homeotropic orientation). Therefore, the inorganic oriented films 3 and 4 having the constitution are useful for constituting a VA (vertical alignment) type liquid crystal panel.

Furthermore, the orientation directions of the liquid crystal molecules are aligned in one direction (vertical direction) more precisely owing to the high structural regularity of the inorganic oriented films 3 and 4. As a result, the liquid crystal panel 1 can be improved in performance (characteristics).

The angle (angle θ in FIG. 2) between the fine pores 30 and 40 and the TFT substrate 17 or the counter substrate 12 for a liquid crystal panel is not particularly limited, and is preferably about from 45 to 85°, and more preferably about from 55 to 75°. According to the constitution, the liquid crystal molecules can be vertically oriented further certainly.

The inorganic oriented films 3 and 4 can be constituted by an oblique vapor-deposited film, an electron beam vapor-deposited film and a film formed by a magnetron sputtering method or an ion beam sputtering method, and in particular, it is preferably constituted by an oblique vapor-deposited film. An oblique vapor-deposited film is preferred since the orientation property of the fine pores 30 and 40 is improved, and the formation thereof can be attained with high accuracy.

The inorganic oriented films 3 and 4 constituted by an oblique vapor-deposited film particularly have the fine pores 30 and 40 in a high density, and thus the advantages of the invention described later can be significantly exerted by applying the constitution of the invention to the liquid crystal panel 1 equipped with the inorganic oriented films 3 and 4.

The inorganic oriented films 3 and 4 are preferably constituted by an inorganic oxide as a major component. In general, an inorganic material has excellent chemical stability (light stability) as compared to an organic material, and therefore, the inorganic oriented films 3 and 4 have particularly excellent light stability as compared to an oriented film constituted by an organic material.

The inorganic oxide constituting the inorganic oriented films 3 and 4 preferably has a relatively low dielectric constant. According to the constitution, the liquid crystal panel 1 can be effectively prevented from suffering burn-in, etc.

Examples of the inorganic oxide include a silicon oxide, such as $SiO_2$ and SiO, and a metallic oxide, such as $Al_2O_3$, MgO, TiO, $TiO_2$, $In_2O_3$, $Sb_2O_3$, $Ta_2O_5$, $Y_2O_3$, $CeO_2$, $WO_3$, $CrO_3$, $GaO_3$, $HfO_2$, $Ti_3O_5$, NiO, ZnO, $Nb_2O_5$, $ZrO_2$ and $Ta_2O_5$, which may be used singly or in combination of two or more kinds of them, and in particular, $SiO_2$ or $Al_2O_3$ is preferably used as a major component. $SiO_2$ and $Al_2O_3$ have a particularly low dielectric constant and high light stability.

The inorganic oriented films 3 and 4 show such a tendency that the orientation property to the liquid crystal molecules contained in the liquid crystal layer 2 (orientation property depending on the shape of the inorganic oriented film) is increased with increasing the proportion occupied by the fine pores 30 and 40, i.e., increasing the density of the fine pores 30 and 40 regularly arranged. On the other hand, when the proportion occupied by the fine pores 30 and 40 is too large, there is such a tendency that the number of active hydroxyl groups being present and exposed on the surfaces of the inorganic oriented films 3 and 4 and the inner surfaces of the fine pores 30 and 40 is increased to cause adhesion of various impurities and reaction with the liquid crystal molecules with lapse of time, whereby the vertical anchoring force is decreased to promote orientation abnormality.

Therefore, the inorganic oriented films 3 and 4 having a proportion occupied by the fine pores 30 and 40 in a suitable range can exhibit excellent orientation property to the liquid crystal molecules for a prolonged period of time.

Examples of the impurities include impurities and unreacted components contained in the sealing material for sealing the liquid crystal layer 2, impurities and water contained in the liquid crystal layer, and contamination attached in the production process.

The proportion occupied by the fine pores 30 and 40 in the inorganic oriented films 3 and 4 can be determined by the ratios of the surface areas of the inorganic oriented films 3 and 4 to the surface areas of the upper surface of the TFT substrate 17 and the upper surface of the counter substrate 12 for a liquid crystal panel, i.e., the surfaces on the side where the inorganic oriented films 3 and 4 are formed, respectively, as an index. The surface area of the inorganic oriented film 3 or 4 herein means the sum of the area on the surface of the inorganic oriented film 3 or 4 and the area on the inner surfaces of the fine pores 30 or 40.

The proportion occupied by the fine pores 30 and 40 in the inorganic oriented films 3 and 4 is larger when the surface area is larger.

As the measurement method for the surface areas, the BET (Brunauer-Emmett-Teller) method is preferably employed. While the measurement method of surface area includes a gas adsorption method (such as the BET method and the Harkins-Jura relative method), a liquid phase adsorption method, an immersion heat method and a penetration method, the surface area of the inorganic oriented film 3 or 4 having a complicated shape, i.e., the total area of the surface of the inorganic oriented film 3 or 4 and the inner surfaces of the fine pores 30 or 40, can be measured accurately by the BET method.

The ratio of the surface area varies under influence of (depending on) the thickness of the inorganic oriented films 3 and 4.

As a result of earnest investigations made by the inventors taking these factors into consideration, it has been found that when the inorganic oriented films 3 and 4 satisfy the following conditions, the orientation property of the liquid crystal molecules is significantly improved.

That is, the surface area $S_1$ ($nm^2$) on the upper surface of the TFT substrate 17 or the counter substrate 12 for a liquid crystal panel measured by the BET method, the surface area $S_2$ ($nm^2$) of the inorganic oriented film 3 or 4 measured by the BET method, and the average thickness t (nm) of the inorganic oriented film 3 or 4 preferably satisfy the relationship $0.55 \log_e t \leq S_2/S_1 \leq 0.55 \log_e t+4.4$.

According to the constitution, considerably decrease in orientation property of the liquid crystal molecules in the initial stage due to an excessively small area ratio $S_2/S_1$, i.e., an excessively small proportion occupied by the fine pores 30 and 40 in the inorganic oriented films 3 and 4, can be prevented from occurring, and also decrease in orientation property of the liquid crystal molecules with the lapse of time due to an excessively large area ratio $S_2/S_1$, i.e., an excessively large amount of active hydroxyl groups present on the inorganic oriented films 3 and 4, can be prevented from occurring.

The BET method may be either the BET multipoint method or the BET single point method, and the BET multipoint method is preferably used. The surface areas of the inorganic oriented films 3 and 4 can be measured more accurately according to the BET multipoint method.

Examples of an absorbing gas used in the BET method include a rare gas, such as krypton gas and neon gas, and nitrogen gas, and a rare gas, particularly krypton gas, is preferably used. The surface area can be measured with good reproducibility according to the BET method using krypton gas.

The area ratio $S_2/S_1$ and the average thickness t may satisfy the relationship $0.55 \log_e t \leq S_2/S_1 \leq 0.55 \log_e t+4.4$, preferably the relationship $0.55 \log_e t \leq S_2/S_1 \leq 0.55 \log_e t+3.5$, and more preferably the relationship $0.55 \log_e t+0.5 \leq S_2/S_1 \leq 0.55 \log_e t+2$.

The surface areas of the inorganic oriented films 3 and 4 can be controlled by appropriately setting the conditions upon forming the inorganic oriented films 3 and 4 (for example, the conditions upon oblique vapor deposition described later, such as the vacuum degree in the vapor deposition apparatus and the vapor deposition rate).

The specific value of the average thickness t is preferably about from 20 to 300 nm, more preferably about from 20 to 150 nm, and further preferably about from 40 to 80 nm. In the case where the thickness of the inorganic oriented films 3 and 4 is too small, the liquid crystal molecules might be in direct contact with the pixel electrode 172 (transparent conductive film 14) to fail to prevent short circuit from occurring. In the case where the thickness of the inorganic oriented films 3 and 4 is too large, on the other hand, the driving voltage of the liquid crystal panel 1 might be too high to increase the electric power consumption.

The specific value of the area ratio $S_2/S_1$ is preferably about from 2 to 5, and more preferably about from 2.5 to 4. According to the constitution, the orientation property of the liquid crystal molecules can be further improved.

While the case where the inorganic oriented films 3 and 4 are constituted by an inorganic oxide as a major component has been described, the inorganic oriented films 3 and 4 may be constituted, for example, by an inorganic nitride, such as SiN, or an inorganic fluoride, such as $MgF_2$, as a major component, or by a material containing arbitrary two or more kinds of the inorganic oxide, the inorganic nitride and the inorganic fluoride. In these cases, the relationship between the area ratio $S_2/S_1$ and the average thickness t, and the specific values of the area ratio $S_2/S_1$ and the average thickness t are preferably in the aforementioned ranges.

In the case where the inorganic oriented films 3 and 4 are constituted by an inorganic oxide as a major component, the inorganic oriented films 3 and 4 are preferably subjected, at least on the surface thereof (preferably on the surface and the inner surfaces of the fine pores 30 and 40), to a hydroxyl group reduction treatment.

The hydroxyl group reduction treatment is such a treatment that active hydroxyl groups present (exposed) on the inorganic oriented films 3 and 4 are reacted with a compound capable of being reacted with the hydroxyl groups.

According to the treatment, the number of active hydroxyl groups present on the inorganic oriented films 3 and 4 can be decreased, whereby the inorganic oriented films 3 and 4 can be prevented from being attached with various impurities, and the inorganic oriented films 3 and 4 are prevented from being reacted with the liquid crystal molecules. Accordingly, for example, the vertical anchoring force of the inorganic oriented films 3 and 4 to the liquid crystal molecules can be prevented from being decreased, and as a result, orientation abnormality can be certainly prevented from occurring in the liquid crystal molecules.

In particular, when the compound is chemically bonded to hydroxyl groups present on the inner surfaces of the fine pores 30 and 40, the aforementioned advantage can be significantly obtained.

In the case where the inorganic oriented films 3 and 4 satisfies the aforementioned relationship (i.e., the relationship between the area ratio $S_2/S_1$ and the average thickness t), the compound can be chemically bonded certainly not only to hydroxyl groups on the surfaces of the inorganic oriented films 3 and 4 but also to those on the inner surfaces of the fine pores 30 and 40.

An alcohol is preferably used as the compound.

In this case, the inorganic oriented films 3 and 4 are treated with an alcohol having the same composition (the same kind), and the average molecular weights of alcohols chemically bonded to the inorganic oriented films 3 and 4 may be the same as each other. However, it is preferred that the average molecular weights of alcohols chemically bonded to the inorganic oriented films 3 and 4 are different from each other.

It is preferred in this embodiment that the average molecular weight of an alcohol on the oriented film 3 provided on the side of the TFT substrate 17 is larger than the average molecular weight of an alcohol on the oriented film 4 provided on the side of the counter substrate 12 for a liquid crystal panel. In other words, it is preferred that the inorganic oriented film 4 is chemically bonded to an alcohol having a larger molecular weight (larger carbon number) in a larger amount than the inorganic oriented film 3. According to the constitution, the liquid crystal panel 1 can be improved in characteristics.

In general, from the standpoint of preventing the liquid crystal panel 1 from suffering burn-in, the tendency of burn-in is increased when the force for orienting the liquid crystal molecules is too large beyond necessity, and therefore, in order to decrease the intermolecular force between the liquid crystal molecules and the oriented films to some extent, an alcohol having a relatively small molecular weight (relatively small carbon number) is preferably selected as the alcohol chemically bonded to the inorganic oriented films 3 and 4.

On the other hand, from the standpoint of preventing the liquid crystal panel 1 from suffering orientation abnormality (the standpoint of improving light stability and durability) associated with reaction between the hydroxyl groups present on the inorganic oriented films 3 and 4 and the liquid crystal molecules, in order to make the liquid crystal molecules remote from hydroxyl groups remaining on the surfaces of the inorganic oriented films 3 and 4 as much as possible, an alcohol having a relatively large molecular weight (relatively large carbon number) is preferably selected as the alcohol chemically bonded to the inorganic oriented films 3 and 4.

The TFT substrate 17 is liable to have a higher temperature than the counter substrate 12 for a liquid crystal panel owing to the presence of the TFT 173, and hydroxyl groups remaining on the inorganic oriented film 3 has higher activity due to heating. Accordingly, the liquid crystal molecules are in such a state that they are liable to be altered and deteriorated through reaction with the hydroxyl groups at the interface between the inorganic oriented film 3 and the liquid crystal layer 2. Therefore, it is particularly effective for preventing the liquid crystal molecules from being in contact with the inorganic oriented film 3 that an alcohol having a larger molecular weight is chemically bonded to the inorganic oriented film 3 on the side of the TFT substrate 17.

On the inorganic oriented film 4 on the side of the counter substrate 12 for a liquid crystal panel, on the other hand, it is preferred that an alcohol having a smaller molecular weight is positively selected since prevention of burn-in may be mainly intended.

In this case, it is sufficient that the alcohols on the inorganic oriented films 3 and 4 have difference in average molecular weight, and as the alcohols, an alcohol having a high molecular weight and an alcohol having a low molecular weight may be appropriately combined.

Particularly, in the case where an alcohol having a low molecular weight is used in combination in the inorganic oriented film 3, in which an alcohol having a high molecular weight is to be used, an alcohol can be chemically bonded to hydroxyl groups among molecules of the alcohol having a high molecular weight and to hydroxyl groups present in the deep parts of the fine pores 30, so as to provide such an advantage that the number of hydroxyl groups remaining on the inorganic oriented film 3 can be further certainly decreased.

Because of the aforementioned factors, it is preferred to select the alcohols in such a manner that the average molecular weight of the alcohol on the inorganic oriented film 3 provided on the side of the TFT substrate 17 is larger than the average molecular weight of the alcohol on the inorganic oriented film 4 provided on the side of the counter substrate 12 for a liquid crystal panel.

In the case of alcohol x>alcohol Y>alcohol Z in terms of molecular weight, examples of the combination where the average molecular weight of the alcohol on the inorganic oriented film 3 is larger than the average molecular weight of the alcohol on the inorganic oriented film 4 include the following combinations.

I: inorganic oriented film 3: X, inorganic oriented film 4: Y or Z

II: inorganic oriented film 3: X+Y, inorganic oriented film 4: X+Y (provided that X/Y: inorganic oriented film 3>inorganic oriented film 4)

III: inorganic oriented film 3: X+Y, inorganic oriented film 4: Y+Z

IV: inorganic oriented film 3: X, inorganic oriented film 4: Y+Z

In the case where one of the alcohol on the inorganic oriented film 3 and the alcohol on the inorganic oriented film 4 contains plural kinds of alcohols, and the other contains only one kind of alcohol, it is preferred that the plural kinds of alcohols include the same kind of alcohol as the alcohol on the other oriented film (see item IV above).

In the case where both the alcohol on the inorganic oriented film 3 and the alcohol on the inorganic oriented film 4 contain plural kinds of alcohols, it is preferred that the alcohol on the inorganic oriented film 3 and the alcohol on the inorganic oriented film 4 contain the same kind of alcohol (see item III above).

In the case where the alcohol on the inorganic oriented film 3 and the alcohol on the inorganic oriented film 4 contain the same kind of alcohol, the vertical anchoring forces in the inorganic oriented films 3 and 4 can be prevented from causing a large difference between them upon controlling the vertical anchoring forces to the liquid crystal molecules. In other words, a minute difference in force can be easily controlled. Accordingly, such an advantage is obtained that control of the vertical anchoring force to the liquid crystal molecules is facilitated.

The alcohol on the inorganic oriented film 3 preferably has an average molecular weight of about from 100 to 400, and more preferably about from 120 to 400. According to the constitution, the period of time required for occurring orientation abnormality in the liquid crystal panel 1 can be certainly prolonged, and in other words, the durability (light stability) can be further certainly improved.

The alcohol on the inorganic oriented film 3 preferably contains an alcohol having from 6 to 30 carbon atoms (particularly from 8 to 30 carbon atoms) as a major component. According to the constitution, the aforementioned advantage can be significantly obtained.

An alcohol having the aforementioned carbon number is in a liquid state at ordinary temperature, and even though it is in a semi-solid state (solid state), it can be in a liquid state at a relatively low temperature. Therefore, it is easy to handle upon treating the inorganic oriented films 3 and 4 with a treating solution described later. Furthermore, it has higher affinity to the liquid crystal molecules, and thus the vertical anchoring force to the liquid crystal molecules can be certainly increased.

Examples of the alcohol include an aliphatic alcohol, an aromatic alcohol, an alicyclic alcohol, a heterocyclic alcohol, a polyhydric alcohol, and halogen-substituted compounds (particularly fluorine-substituted compounds) thereof, and among these, an aliphatic alcohol, an alicyclic alcohol, and fluorine-substituted compounds (fluoroalcohols) thereof are preferred. By using an aliphatic alcohol, an alicyclic alcohol, and fluorine-substituted compounds thereof, the vertical anchoring force to the liquid crystal molecules is further increased to vertically orient the liquid crystal molecules more certainly.

As the alicyclic alcohol or a fluorine-substituted compound thereof, those having a steroid skeleton are more preferred. The alicyclic alcohol or a fluorine-substituted compound thereof having a steroid skeleton is excellent particularly in the function of orientation control of the liquid crystal molecules owing to the structure thereof having high planarity.

Accordingly, preferred examples of the alcohol on the inorganic oriented film 3 include an aliphatic alcohol, such as octanol, nonanol, decanol, undecanol, dodecanol, tridecanol, tetradecanol, pentadecanol, hexadecanol, heptadecanol, octadecanol, eicosanol, heneicosanol, docosanol, tricosanol and tetracosanol, an alicyclic alcohol, such as cholesterol, epicholesterol, cholestanol, epicholestanol, ergosterol, epiergosterol, coprostanol, epicoprostanol, $\alpha$-ergosterol, $\beta$-sitosterol, stigmasterol and campesterol, and fluorine-substituted compounds thereof.

In the aliphatic alcohol and a fluorine-substituted compound thereof, the hydrocarbon part (main skeleton part) thereof may be in a linear form or a branched form.

The alcohol on the inorganic oriented film 4 preferably has an average molecular weight of about from 32 to 70, and more preferably about from 32 to 60. According to the constitution, the liquid crystal panel 1 can be further certainly prevented from suffering burn-in.

The alcohol on the inorganic oriented film 4 preferably contains an alcohol having from 1 to 4 carbon atoms (particularly from 1 to 3 carbon atoms) as a major component. According to the constitution, the aforementioned advantage can be significantly obtained.

An alcohol having the aforementioned carbon number has a small molecular size and can be certainly penetrated into the deep parts of the fine pores 40. Furthermore, it is in a liquid state at ordinary temperature and thus is easy to handle upon treating the inorganic oriented film 4 with a treating solution described later.

Examples of the alcohol include an aliphatic alcohol, a polyhydric alcohol, and halogen-substituted compounds (particularly fluorine-substituted compounds) thereof, and among these, an aliphatic alcohol and a fluorine-substituted compound (fluoroalcohols) thereof are preferred.

Accordingly, the alcohol on the inorganic oriented film 4 is preferably those containing methanol, ethanol, propanol, and fluorine-substituted compounds thereof as a major component.

Since there are many fluorinated compounds as liquid crystal molecules, the use of a fluorine-substituted compound improves the affinity to the liquid crystal molecules to increase the effect of vertically orienting the liquid crystal molecules.

When the average molecular weights of the alcohols on the inorganic oriented films 3 and 4 are differentiated from each other, not only orientation abnormality and burn-in can be prevented from occurring, but also, for example, electric fluctuation of the pair of oriented films can be resolved.

The hydroxyl group reduction treatment also includes, in addition to the treatment of chemically bonding an alcohol, for example, a treatment of chemically bonding various kinds of coupling agents, such as a silane coupling agent having a hydrocarbon part as similar to the aforementioned alcohols. The use of the treatment of chemically bonding the coupling agent also provides the same advantage as above.

The hydroxyl group reduction treatment is preferably the alcohol treatment since the alcohol treatment can be carried out easily at low cost, and an alcohol is easy to handle.

The hydroxyl group reduction treatment may be omitted depending on necessity.

The liquid crystal panel 1 has a sealing part 5 between the inorganic oriented films 3 and 4 along the outer periphery thereof, as shown in FIGS. 1 and 2.

The sealing part 5 has such a function that the liquid crystal layer 2 is sealed to prevent it from flowing out of the liquid crystal panel 1.

Examples of the material constituting the sealing part 5 include a resin material having a polymerizable group, such as an epoxy series resin (an epoxy resin and an acrylic-modified epoxy resin), an acrylic series resin and a vinyl series resin, polycarbonate, polyimide and polyamide.

In the invention, a filling material 6 containing a compound having a first functional group having high affinity with the inorganic oriented films 3 and 4 and a second functional group having high affinity with the sealing part 5 is filled in an area of the inorganic oriented films 3 and 4 overlapping the sealing part 5 to fill the fine pores 30 and 40 and to covers surfaces thereof.

According to the constitution, the adhesion property between the sealing part 5 and the inorganic oriented films 3 and 4 can be improved. Therefore, water can be prevented from invading into the liquid crystal layer 2 from the interface (boundary) between the sealing part 5 and the inorganic oriented films 3 and 4.

Furthermore, the fine pores 30 and 40 are filled with the filling material 6 in the outer periphery of the inorganic oriented films 3 and 4. Therefore, water can be prevented from invading into the liquid crystal layer 2 through the fine pores 30 and 40.

Owing to the factors, the liquid crystal molecules in the liquid crystal layer 2 can be prevented from being altered and deteriorated in a short period of time due to contact with water. Accordingly, a liquid crystal panel 1 excellent in durability can be obtained.

In particular, the inorganic oriented films 3 and 4 satisfying the aforementioned relationship (i.e., the relationship between the area ratio $S_2/S_1$ and the average thickness t) has a large proportion occupied by the fine pores 30 and 40. Accordingly, invasion of water into the liquid crystal layer 2 through the fine pores 30 and 40 cannot be ignored in the liquid crystal panel 1 having such inorganic oriented films 3 and 4. In the invention, however, since the fine pores 30 and 40 are filled with the filling material 6, invasion of water into the liquid crystal layer 2 can be certainly prevented from occurring while using the inorganic oriented films 3 and 4 having a large proportion occupied by the fine pores 30 and 40.

Therefore, by applying the invention to the liquid crystal panel 1 equipped with the inorganic oriented films 3 and 4 satisfying the aforementioned relationship (i.e., the relationship between the area ratio $S_2/S_1$ and the average thickness t), such a liquid crystal panel 1 can be constituted that exhibits excellent orientation property to the liquid crystal molecules and prevents the liquid crystal molecules from being altered and deteriorated, for a long period of time, and in other words, such a liquid crystal panel 1 can be constituted that maintains excellent characteristics for a long period of time.

The filling material 6 may contain the aforementioned compound as a major component or may be a mixture with other materials.

In the later case, such a material is preferably used that has poor reactivity with the aforementioned compound. Examples of the material include a polyolefin, such as polyethylene, polypropylene, an ethylene-propylene copolymer and an ethylene-vinyl acetate copolymer (EVA), a cyclic polyolefin, a modified polyolefin, polyvinyl chloride, polyvinylidene chloride, polystyrene, polyamide, polyimide, polyamideimide, polycarbonate, poly(4-methylpentene-1), an ionomer, an acrylic series resin, polymethyl methacrylate, an acrylonitrile-butadiene-styrene copolymer (ABS resin), an acrylonitrile-styrene copolymer (AS resin), a butadiene-styrene copolymer, polyoxymethylene, polyvinyl alcohol (PVA), an ethylene-vinyl alcohol copolymer (EVOH), a polyester, such as polyethylene terephthalate (PET), polybutyrene terephthalate (PBT) and polycyclohexane terephthalate (PCT), various kinds of thermoplastic elastomers, such as a styrene series, a polyolefin series, a polyvinyl chloride series, a polyurethane series, a polyester series, a polyamide series, a polybutadiene series, a trans-polyisoprene series, a fluorine rubber series and a chlorinated polyethylene series, and a resin material, such as an epoxy resin, a phenol resin, a urea resin, a melamine resin, an unsaturated polyester resin, a silicone resin and a polyurethane resin, which may be used singly or in combination of two or more kinds of them.

The content of the aforementioned compound in the filling material 6 is not particularly limited, and is preferably 50% by weight or more, and more preferably 70% by weight or more. In the case where the content (content ratio) of the aforementioned compound in the filling material 6 is too small, there is such a tendency that the adhesion property between the sealing part 5 and the filling material 6 is lowered depending on the kind of the constitutional material of the sealing part 5 and the kind of the aforementioned compound.

In the compound, the first functional group is preferably a group forming a covalent bond with the inorganic oriented films 3 and 4, and the second functional group is preferably a group forming a covalent bond with the sealing part 5. According to the constitution, the adhesion property between the inorganic oriented films 3 and 4 and the sealing part 5 through the filling material 6 can be further improved. As a result, water can be further certainly prevented from invading into the liquid crystal layer 2.

The inorganic oriented films 3 and 4 are preferably constituted by an inorganic oxide (particularly, $SiO_2$ or $Al_2O_3$) as a major component as having been described. In this case, examples of the first functional group include an alkylsilyl group, a halogenated silyl group, a hydroxyl group, a thiol group and a halogen group, and among these, an alkylsilyl group and a hydroxyl group are particularly preferred. These functional groups have high reactivity with hydroxyl groups present in the inorganic oriented films 3 and 4 to improve the adhesion property between the filling material 6 and the inorganic oriented films 3 and 4.

In the case where the sealing part 5 is constituted by a resin material having a polymerizable group as a major component, the second functional group is preferably a group capable of being polymerized with the polymerizable group. According to the constitution, the adhesion property between the filling material 6 and the sealing part 5 can be improved.

In the case, for examples where the resin material constituting the sealing part 5 has an epoxy group as a polymerizable group, examples of the second functional group include an epoxy group, a (meth)acrylic group, a vinyl group and an amino group, and an epoxy group is particularly preferred. In the case where the resin material has a (meth)acrylic group as a polymerizable group, examples of the second functional group include a (meth) acrylic group, an epoxy group and a vinyl group, and a (meth)acrylic group and a vinyl group are particularly preferred.

The compound preferably has a molecular weight of about from 100 to 500, and more preferably about from 130 to 400. The compound having a molecular weight in the range is in a liquid state at ordinary temperature or in a liquid state at a relatively low temperature, and therefore, it is easy to handle and is high in solubility in various kinds of solvents. Accordingly, preparation of a filling material composition described later and its handling are facilitated.

The use of the compound having a molecular weight in the range is preferred since it facilitates uniform mixing upon preparing a mixture of the filling material 6 and other materials.

Specific examples of the compound include a silane coupling agent, such as vinylmethoxysilane, vinylethoxysilane, N-(2-aminoethyl)-3-aminopropylmethyldimethoxysilane, N-(2-aminoethyl)-3-aminopropyltrimethoxysilane, 3-aminopropyltriethoxysilane, 3-aminopropyltrimethoxysilane, 3-glycidoxypropyltrimethoxysilane, 3-glycidoxypropylmethyldimethoxysilane, 2-(3,4-epoxycyclohexyl)ethyltrimethoxysilane, 3-methacryloxypropyltrimethoxysilane and N,N'-bis(3-(trimethoxysilyl)propyl)ethylenediamine, and an alcohol, such as vinyl alcohol, N-(2-aminoethyl)-3-aminopropanol, 3-aminopropanol, 3-glycidoxypropanol, 2-(3,4-epoxycyclohexyl)ethanol, 3-methacryloxypropanol, N,N'-bis(3-(hydroxy)propyl)ethylenediamine, which may be used singly or in combination of two or more kinds of them.

As the compound, a polymer having the first functional group and the second functional group may also be used.

The liquid crystal panel 1 can be produced, for example, in the following manner.

(1) A TFT substrate 17 and a counter substrate 12 for a liquid crystal panel are produced in a known method. An inorganic oriented film 3 is formed on the TFT substrate 17 to cover pixel electrodes 172 and TFT 173, and an inorganic oriented film 4 is formed on a transparent conductive film 14 on the counter substrate 12 for a liquid crystal panel (first step).

The inorganic oriented films 3 and 4 can be produced in the same formation method (formation step), and thus the formation method of the inorganic oriented film 3 is described below as a representative.

Figure 3:
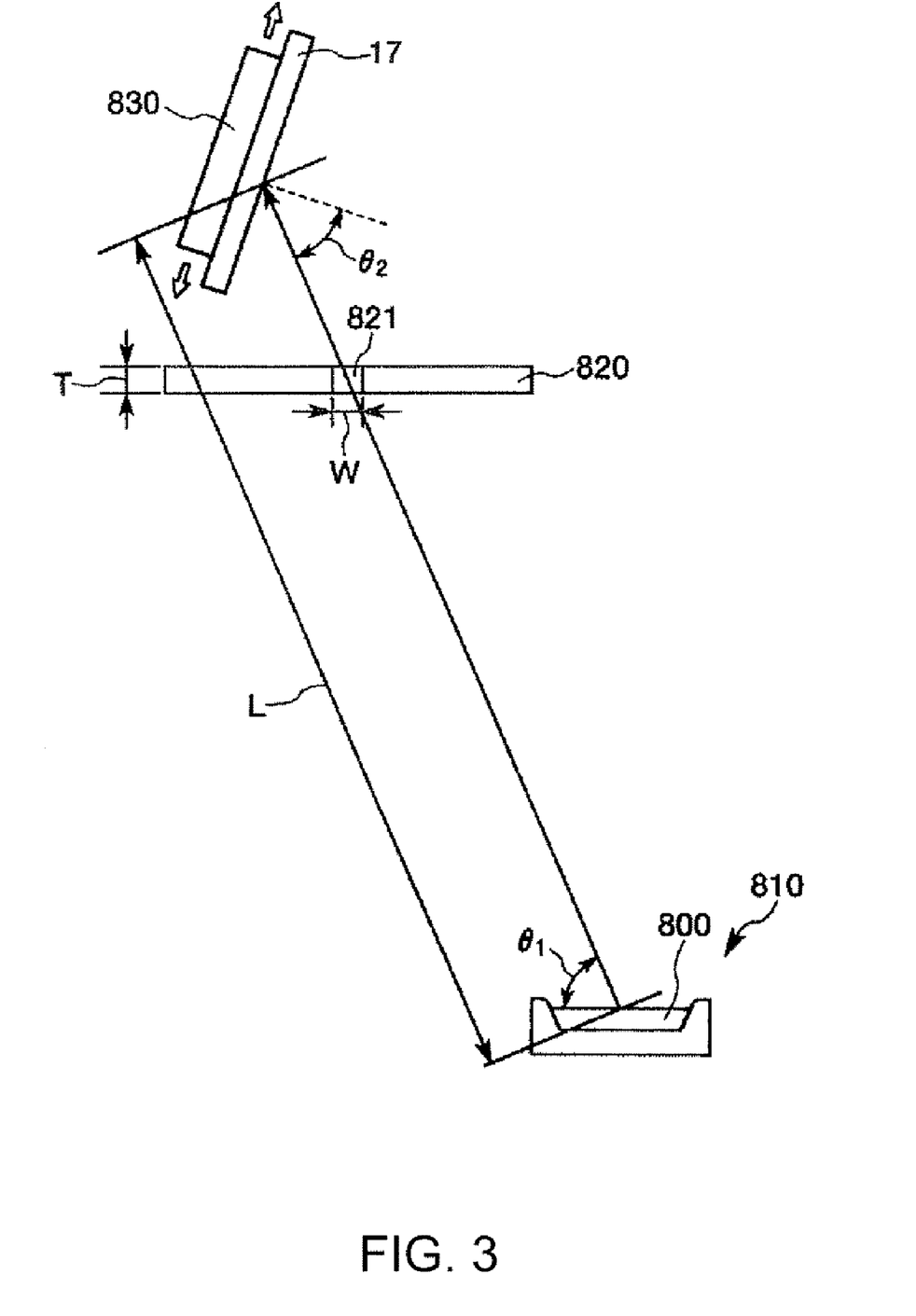
FIG. 3 is a schematic illustration showing a vapor deposition apparatus used in a method for producing the liquid crystal panel shown in FIG. 1.

The case where the inorganic oriented film 3 is formed by an oblique vapor deposition method is described herein.

In an oblique vapor deposition method, as shown in FIG. 3, a vapor deposition source 810 housing an inorganic oxide (raw material) 800 and the TFT substrate 17 are placed in a chamber (which is not shown in the figure), and a slit plate 820 having a slit 821 formed therein is disposed between them.

The TFT substrate 17 is fixed to a driving device 830 and is capable of being moved horizontally with a vapor deposition angle (angle $\theta_2$ in FIG. 3) described later maintained. The TFT substrate 17 can be heated with a heating device, which is not shown in the figure.

Under the state, the inorganic oxide 800 is vaporized by heating with a heating device (which is not shown in the figure) provided in the vapor deposition source 810. The vaporized particles of the inorganic oxide 800 are made arrive at the upper surface (i.e., the surface, on which the inorganic oriented film 3 is to be formed) of the TFT substrate 17 through the slit 821 of the slit plate 820.

At this time, the TFT substrate 17 is heated to a prescribed temperature with the heating device and is moved horizontally at a prescribed speed with the driving device 830.

According to the operation, the inorganic oriented film 3 having plural fine pores 30 is obtained on the TFT substrate 17.

The vapor deposition angle (angle $\theta_2$ in FIG. 3) where the vaporized inorganic oxide (evaporated particles) 800 evaporated from the vapor deposition source arrive at the upper surface of the TFT substrate 17 is appropriately determined to control the angle of the fine pores 30 with respect to the upper surface of the TFT substrate 17.

The surface area $S_2$ of the inorganic oriented film 3 depends greatly on the state of the structure (column structure) formed when the vaporized inorganic oxide 800 arrives at the substrate, and can be controlled by appropriately setting various conditions, such as the vacuum degree in the chamber upon vapor deposition, the vapor deposition rate, the temperature (substrate temperature) of the TFT substrate 17 and the vapor deposition angle $\theta_2$.

The vacuum degree in the chamber (vapor deposition apparatus) is preferably about from $1 \times 10^{-5}$ to $1 \times 10^{-2}$ Pa, and more preferably about from $5 \times 10^{-5}$ to $5 \times 10^{-3}$ Pa.

The substrate temperature upon vapor deposition is preferably about from 20 to 150° C., and more preferably about from 50 to 120° C.

The vapor deposition rate is preferably about from 2.5 to 25 Å/sec, and more preferably about from 4 to 20 Å/sec.

The vapor deposition angle $\theta_2$ is preferably about from 45 to 85°, and more preferably about from 50 to 75°.

The inorganic oriented film 3 having the intended area ratio $S_2/S_1$ can be precisely obtained by setting the conditions in the aforementioned ranges.

For example, a vacuum degree set smaller provides such a tendency that the surface area $S_2$ is decreased, a substrate temperature set higher provides such a tendency that the surface area $S_2$ is decreased, and a vapor deposition angle $\theta_2$ set larger provides such a tendency that the surface area $S_2$ is increased by the self-shadowing effect.

The directional uniformity of the column structure, i.e., the orientation property of the inorganic oriented film 3, can be controlled by appropriately setting the directional angle (angle $\theta_1$ in FIG. 3) between the vapor deposition source 810 and the TFT substrate 17, the distance (L in FIG. 3) between the TFT substrate 17 and the vapor deposition source 810, the thickness (T in FIG. 3) of the slit plate 820, and the width (W in FIG. 3) of the slit 821.

(2) Subsequently, the inorganic oriented film 3 is subjected to a hydroxyl group reduction treatment.

Figure 4:
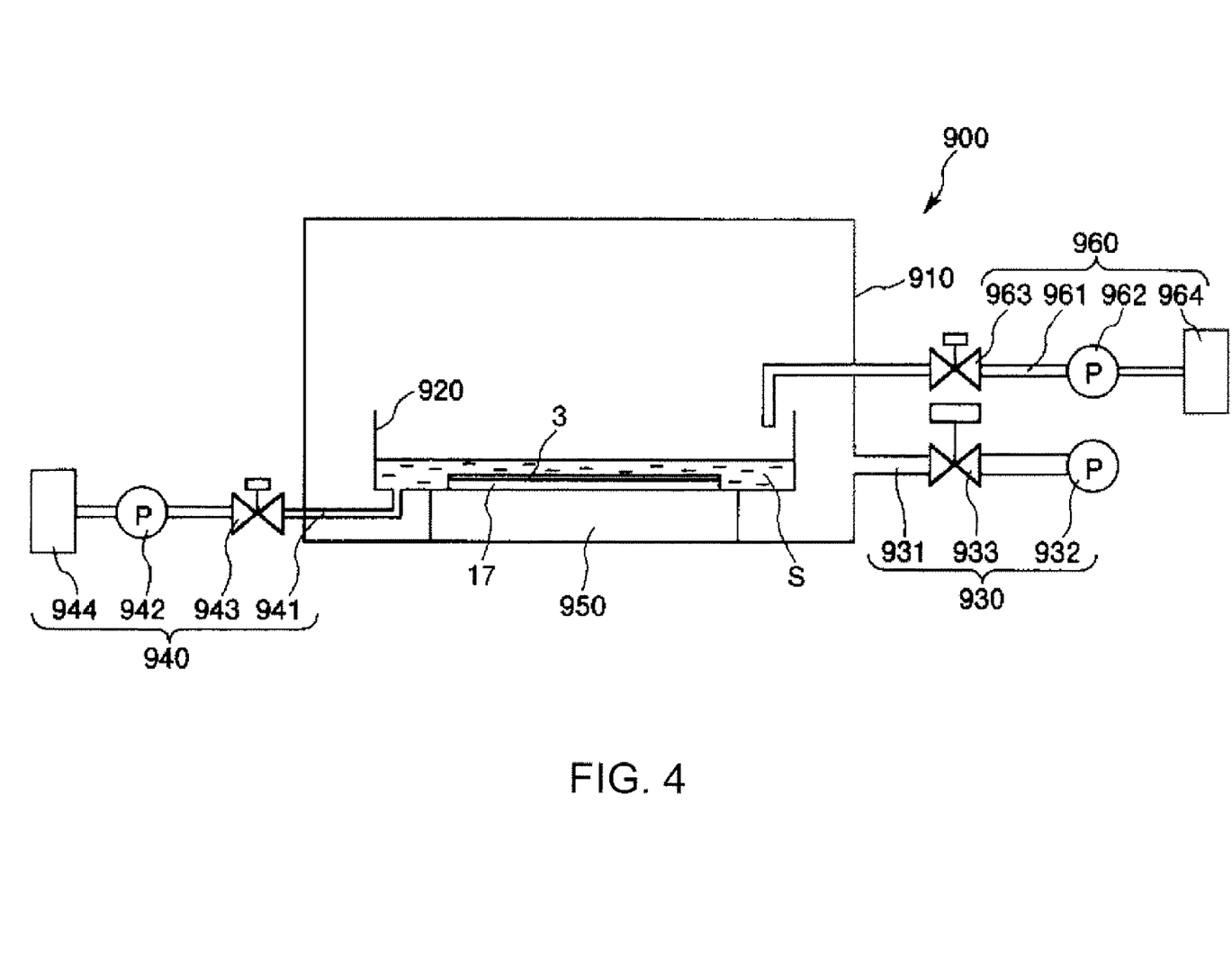
FIG. 4 is a schematic illustration showing a constitution of a processing apparatus used in a method for producing the liquid crystal panel shown in FIG. 1.

A treating apparatus 900 shown in FIG. 4, for example, is used in the hydroxyl group reduction treatment.

The treating apparatus 900 shown in FIG. 4 has a chamber 910, a stage 950 provided inside the chamber 910, a vessel 920 disposed on the stage 950, a liquid feeding device 960 feeding a treating liquid S to the vessel 920, a liquid discharging device 940 discharging the treating liquid S in the vessel 920, and an evacuation device 930 evacuating the chamber 910.

A heating device (which is not shown in the figure), such as a heater, is provided in the stage 950.

The evacuation device 930 is constituted by a pump 932, an evacuation line 931 connecting the pump 932 and the chamber 910, and a valve 933 provided in the midstream of the evacuation line 931.

The liquid discharging device 940 is constituted by a recovery tank 944 recovering the treating liquid S, a discharging line 941 connecting the recovery tank 944 and the vessel 920, and a valve 943 provided in the midstream of the discharging line 941.

The liquid feeding device 960 is constituted by a reservoir tank 964 housing the treating liquid S, a feeding line 961 feeding the treating liquid S from the reservoir tank 964 to the vessel 920, and a pump 962 and a valve 963 provided in the midstream of the feeding line 961.

The liquid discharging device 940 and the liquid feeding device 960 are equipped with a heating device (such as a heater), which is not shown in the figure, respectively, for heating the treating liquid S.

A case where an alcohol is used as the treating liquid S will be described herein as an example.

(2-1) The TFT substrate 17 having formed thereon the inorganic oriented film 3 is immersed in the treating liquid S containing an alcohol.

Specifically, the chamber 910 is opened, and the TFT substrate 17 having formed thereon the inorganic oriented film 3 is conveyed therein and placed inside the vessel 920.

Subsequently, the chamber 910 is closed, and the pump 962 is driven. Under the state, the valve 963 is opened to feed the treating liquid S from the reservoir tank 964 to the vessel 920 through the feeding line 961.

After feeding a prescribed amount of the treating liquid S, i.e., such an amount of the treating liquid S that the TFT substrate 17 is completely immersed therein, to the vessel 920, the pump 962 is stopped, and the valve 963 is closed.

The alcohol herein may be one in a liquid state at an ordinary temperature or one in a solid state or a semi-solid state at an ordinary temperature.

In the case where an alcohol in a liquid state at an ordinary temperature is used, the treating liquid S may be the alcohol itself (the content of the alcohol may be substantially 100%), or in alternative, a suitable solvent may be mixed with the alcohol.

In the case where an alcohol in a solid state or a semi-solid state at an ordinary temperature is used, the treating liquid S may be the alcohol having been heated into a liquid state, or in alternative, the alcohol may be dissolved in a suitable solvent.

In the case where an alcohol is mixed with or dissolved in a suitable solvent, the solvent is selected from such a solvent that is capable of being mixed with or capable of dissolving the alcohol and has a lower polarity than the alcohol. According to the constitution, the solvent is prevented from impairing the reaction between the hydroxyl groups on the inorganic oriented film 3 and the alcohol, so as to undergo the chemical reaction certainly.

(2-2) Subsequently, the chamber 910 (the space where the treating liquid S is disposed) is depressurized to penetrate the treating liquid S into the fine pores 30 of the inorganic oriented film 3.

Specifically, the chamber 910 is closed, and the pump 932 is driven. Under the state, the valve 933 is opened to evacuate the gas inside the chamber 910 outside the treating apparatus 900 through the evacuation line 931.

The pressure inside the chamber 910 is gradually lowered, whereby the gas (such as the air) in the treating liquid S and inside the fine pores 30 of the inorganic oriented film 3 is removed, and the treating liquid S is penetrated into the fine pores 30.

After the interior of the chamber 910 reaches a prescribed pressure, the pump 932 is stopped, and the valve 933 is closed.

The prescribed pressure of the interior (space) of the chamber 910, i.e., the vacuum degree inside the chamber 910, is preferably about from $1 \times 10^{-4}$ to $1 \times 10^4$ pa, and more preferably about from $1 \times 10^{-2}$ to $1 \times 10^3$ Pa. According to the operation, the air is sufficiently removed from the fine pores 30 of the inorganic oriented film 3, and the treating liquid S can be sufficiently penetrated into the fine pores 30.

Subsequently, the pump 942 is driven, and under the state, the valve 943 is open to recover the excessive treating liquid S in the vessel 920 to the recovery tank 944 through the discharging line 941.

After the treating liquid S is substantially completely recovered from the vessel 920, the pump 942 is stopped, and the valve 943 is closed.

(2-3) Subsequently, the alcohol is chemically bonded to the surface of the inorganic oriented film 3 and the inner surfaces of the fine pores 30.

Specifically, the heating device provided in the stage 950 is operated to heat the TFT substrate 17 having formed thereon the inorganic oriented film 3.

According to the operation, the hydroxyl groups present on the surface of the inorganic oriented film 3 and the inner surfaces of the fine pores 30 undergo a dehydration condensation reaction with the hydroxyl groups of the alcohol, whereby the alcohol is chemically bonded to the surface of the inorganic oriented film 3 and the inner surfaces of the fine pores 30.

Before heating the TFT substrate 17, the interior of the chamber 910 may be again depressurized depending on necessity.

The heating temperature of the TFT substrate 17 is not particularly limited and is preferably about from 80 to 250° C., and more preferably about from 100 to 200° C. In the case where the heating temperature is too low, the alcohol might not be chemically bonded sufficiently to the inorganic oriented film 3 depending on the kind of the alcohol and the kind of the constitutional material of the inorganic oriented film 3, and even in the case where the heating temperature is increased beyond the upper limit value, no further advantage can be expected.

The heating time of the TFT substrate 17 is not particularly limited and is preferably about from 20 to 180 minutes, and more preferably about from 40 to 100 minutes. In the case where the heating time is too short, the alcohol might not be chemically bonded sufficiently to the inorganic oriented film 3 depending on the conditions, such as the heating temperature, and even in the case where the heating temperature is increased beyond the upper limit value, no further advantage can be expected.

By employing the method of heating as the method for reacting the hydroxyl groups present on the surface of the inorganic oriented film 3 and the inner surfaces of the fine pores 30 with the alcohol, the reaction can be certainly carried out in a relatively simple manner.

The method for carrying out the reaction is not limited to the heating method, and for example, it can be carried out by irradiation of an ultraviolet ray or irradiation of an infrared ray. In these cases, the treating apparatus 900 is equipped with such a mechanism (measure) that is required for practicing the treatment.

In the case where plural kinds of alcohols are used as the alcohol, the plural kinds of alcohols may be simultaneously mixed in the treating liquid S. In this case, the ratio of the plural kinds of alcohols to be chemically bonded to the inorganic oriented film 3 may be controlled by appropriately adjusting the mixing ratio of the plural kinds of alcohols in the treating liquid, the kind, the molecular weight and the treating conditions thereof.

In alternative, it is possible that plural kinds of treating liquids each containing the plural kinds of alcohols, respectively, are prepared, and the TFT substrate 17 is treated sequentially with the treating liquids. In this case, it is preferred that the TFT substrate 17 is treated sequentially in the order of from a treating liquid containing an alcohol having the smallest molecular weight to a treating liquid containing an alcohol having the largest molecular weight. According to the operation, the alcohol having a small molecular weight can be chemically bonded certainly to the deep parts of the fine pores 30.

In the case where it is sufficient that the alcohol is chemically bonded selectively to the vicinity of the surface of the inorganic oriented film 3, the surface of the inorganic oriented film 3 may be simply made in contact with the treating liquid S. According to the operation, the use of the treating apparatus 900 having been described can be omitted to simplify the production process of the liquid crystal panel 1 and to reduce the production cost thereof.

Examples of the method for making the inorganic oriented film 3 into contact with the treating liquid S include a method of coating the treating liquid S on the inorganic oriented film 3 (coating method), a method of immersing the TFT substrate 17 having formed thereon the inorganic oriented film 3 in the treating liquids (immersing method), and a method of exposing the inorganic oriented film 3 to vapor of the treating liquid S, which may be employed singly or in combination of two or more of them.

Examples of the coating method include a spin coating method, a casting method, a microgravure coating method, a gravure coating method, a bar coating method, a roll coating method, a wire bar coating method, a dip coating method, a spray coating method, a screen printing method, a flexographic printing method, an offset printing method and an ink-jet printing method.

(3) Subsequently, the filling material 6 is filled in the outer periphery of the inorganic oriented films 3 and 4 (the area forming the sealing part 5) to fill the fine pores 30 and 40 and to covers surfaces of the inorganic oriented films 3 and 4 (second step).

A filling material composition containing the filling material 6 is firstly prepared.

In the case where the filling material 6 is in a liquid state at an ordinary temperature, the filling material composition may be the filling material 6 itself or may be prepared by dissolving it in a suitable solvent. In the case where the filling material 6 is in a solid state, the filling material composition may be prepared by heating the filling material 6 into a liquid state or by dissolving it in a suitable solvent.

The filling material composition is fed selectively to the outer periphery of the inorganic oriented films 3 and 4, and then dried depending on necessity. According to the operation, the filling material 6 can be fed to fill the fine pores 30 and 40 and to covers surfaces of the inorganic oriented films 3 and 4.

Examples of the method for feeding the filling material composition selectively to the outer periphery of the inorganic oriented films 3 and 4 include a method of ejecting liquid droplets of the filling material composition by an inkjet printing method (liquid droplet ejecting method), and a method of feeding the filling material composition by a spin coating method or a dip coating method with an area for providing the liquid crystal layer 2 (area with no necessity of the filling material 6 filled) covered with a mask.

The viscosity of the filling material composition is preferably as low as possible, and is more preferably lower than the viscosity of a liquid sealing material used in the subsequent step (4) described later. According to the constitution, a sufficient amount of the filling material 6 can be filled deeply in the fine pores 30 and 40 of the inorganic oriented films 3 and 4.

Specifically, the viscosity of the filling material composition is preferably about from 0.1 to 100 cP, and more preferably about from 0.5 to 50 cP.

The filling material 6 can be fed to the inorganic oriented films 3 and 4 by a physical vapor phase film forming method, such as a vapor deposition method, or a vapor phase process, such as a chemical vapor phase film forming method, but the aforementioned liquid phase process is preferably employed. By using the liquid phase process, the filling rate of the filling material 6 in the fine pores 30 and 40 can be improved.

The average thickness (m in FIG. 2) of the filling material 6 covering the surface of the inorganic oriented films 3 and 4 is not particularly limited, and is preferably about from 1 to 25 nm, and more preferably about from 2 to 10 nm.

The step (3) may be carried out preceding the aforementioned step (2).

(4) Subsequently, a sealing material in a liquid state forming the sealing part 5 is fed to an area of the inorganic oriented films 3 and 4 having been filled with the filling material 6 (third step).

As the sealing material, a composition containing the constitutional material of the sealing part 5 or a precursor thereof is used.

The viscosity of the sealing material is preferably set at a value that is higher than the viscosity of the filling material composition, and is preferably about from 50 to 100,000 cP, and more preferably about from 100 to 50,000 cP.

As the feeding method of the sealing material, those described for the step (3) may be employed.

(5) Subsequently, the TFT substrate 17 and the counter substrate 12 for a liquid crystal panel are disposed with a gap between them to make the sealing materials in contact with each other, and then the sealing material is hardened (fourth step).

Specifically, the TFT substrate 17 and the counter substrate 12 for a liquid crystal panel are disposed to make the sealing materials in contact with each other, with the inorganic oriented films 3 and 4 facing each other with a prescribed distance between them, and then the sealing material is hardened.

Examples of the method of hardening the sealing material include such methods as drying (removal of a solvent or a dispersion medium), irradiation with an ultraviolet ray, and heating.

The steps (4) and (5) are carried out in such a manner that a through hole is formed in a part of the hardened product of the sealing material. The through hole is used as an injection inlet for injecting a liquid crystal composition to the space (gap) surrounded by the inorganic oriented films 3 and 4 and the hardened product of the sealing material in the subsequent step (6).

(6) Subsequently, a liquid crystal composition is injected into the gap through the injection inlet to form the liquid crystal layer 2 (fifth step).

(7) Subsequently, the injection inlet is sealed (sixth step).

The material used for sealing the injection inlet may be the same material as the sealing material or a material different therefrom.

The liquid crystal panel 1 is thus completed through the aforementioned steps.

Preceding the step (2), such a treatment may be applied to the inorganic oriented films 3 and 4 that organic materials and particles attached thereto upon producing them are removed. According to the operation, the adhesion property between the filling material 6 and the inorganic oriented films 3 and 4 can be further improved, and the hydroxyl group reduction treatment can be carried out with high efficiency.

Preferred examples of the treatment of removing organic materials include irradiation of an ultraviolet ray, a plasma treatment, and a rinsing treatment, in which a rinsing liquid (such as ultrapure water) is used as the treating liquid S in the treating apparatus 900 shown in FIG. 4. Preferred examples of the treatment of removing particles include the aforementioned rinsing treatment.

While the TFT substrate is used as the liquid crystal driving substrate in the liquid crystal panel 1 having been described, other liquid crystal driving substrates than the TFT substrate, such as a TFD substrate and an STN substrate, may be used as the liquid crystal driving substrate.

As an example of the electronic apparatus according to the invention, an electronic apparatus using the aforementioned liquid crystal panel 1 (liquid crystal projector) will be described.

Figure 5:
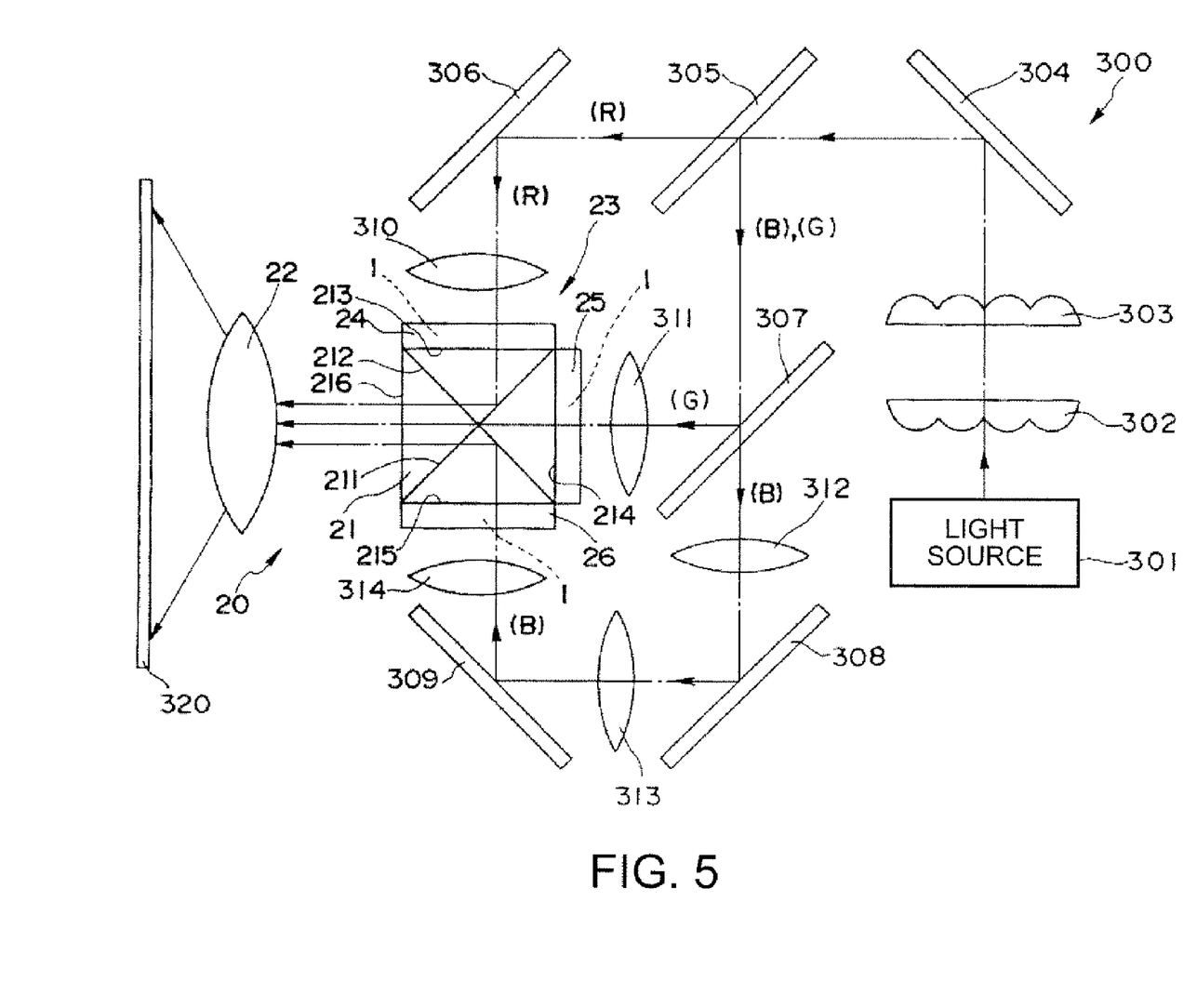
FIG. 5 is a schematic illustration showing an optical system of a projection type display device, to which the electronic apparatus according to the invention is applied.

FIG. 5 is a schematic illustration showing an optical system of the electronic apparatus according to the invention (projection type display device).

As shown in the figure, the projection type display device 300 has a light source 301, an illumination optical system equipped with plural integrator lenses, a color separation optical system (light guiding optical system) equipped with plural dichroic mirrors and the like, a (red) liquid crystal light bulb (liquid crystal light shutter array) 24 corresponding to red color, a (green) liquid crystal light bulb (liquid crystal light shutter array) 25 corresponding to green color, a (blue) liquid crystal light bulb (liquid crystal light shutter array) 26 corresponding to blue color, a dichroic prism (color synthesis optical system) 21 having formed therein a dichroic mirror surface 211 reflecting only red light and a dichroic mirror surface 212 reflecting only blue light, and a projection lens (projection optical system) 22.

The illumination optical system has integrator lenses 302 and 303. The color separation optical system has mirrors 304, 306 and 309, a dichroic mirror 305 reflecting only blue light and green light (transmitting only red light), a dichroic mirror 307 reflecting only green light, a dichroic mirror 308 reflecting only blue light (or a mirror 308 reflecting blue light), and condenser lenses 310, 311, 312, 313 and 314.

The liquid crystal light bulb 25 has the liquid crystal panel 1. The liquid crystal light bulbs 24 and 26 have the same constitution as the liquid crystal light bulb 25. The liquid crystal panels 1 contained in the liquid crystal light bulbs 24, 25 and 26 are connected to driving circuits, which are not shown in the figure, respectively.

In the projection type display device 300, an optical block 20 is constituted by the dichroic prism 21 and the projection lens 22, and a display unit 23 is constituted by the optical block 20 and the liquid crystal light bulbs 24, 25 and 26, which are disposed statically with respect to the dichroic prism 21.

The operation of the projection type display device 300 will be described.

White light (white light flux) emitted from the light source 301 passes through the integrator lenses 302 and 303. The light intensity (luminance distribution) of the white light is made uniform with the integrator lenses 302 and 303. The white light emitted from the light source 301 preferably has a relatively large light intensity, whereby an image formed on a screen 320 can be a sharp image. Furthermore, since the projection type display device 300 uses the liquid crystal panel 1 excellent in light stability, excellent long term stability can be obtained even when the light emitted from the light source 301 has a high intensity.

The white light having passed through the integrator lenses 302 and 303 is reflected left in FIG. 5 by the mirror 304, and blue light (B) and green light (G) in the reflected light are reflected down in FIG. 5 by the dichroic mirror 305, and red light (R) therein passes through the dichroic mirror 305.

The red light having passed through the dichroic mirror 305 is reflected down in FIG. 5 by the mirror 306, and the reflected light is formed by the condenser lens 310 and is incident on the red liquid crystal light bulb 24.

The green light in the blue light and the green light having been reflected by the dichroic mirror 305 is reflected left in FIG. 5 by the dichroic mirror 307, and the blue light therein passes through the dichroic mirror 307.

The green light having been reflected by the dichroic mirror 307 is formed by the condenser lens 311 and is incident on the green liquid crystal bulb 25.

The blue light having passed through the dichroic mirror 307 is reflected left in FIG. 5 by the dichroic mirror (or mirror) 308, and the reflected light is reflected up in FIG. 5 by the mirror 309. The blue light is formed by the condenser lenses 312, 313 and 314 and is incident on the blue liquid crystal light bulb 26.

Accordingly, the white light emitted from the light source 301 is subjected to color separation by the color separation optical system into three primary colors, i.e., red light, green light and blue light, which are guided and incident on the corresponding liquid crystal bulbs, respectively.

In this case, pixels (thin film transistors 173 and pixel electrodes 172 connected thereto) of the liquid crystal panel 1 of the liquid crystal light bulb 24 are subjected to a switching operation (on/off), i.e., modulation, with a driving circuit (driving unit) operated based on a red image signal.

Similarly, green light and blue light are incident on the liquid crystal light bulbs 25 and 26, respectively, and modulated by the liquid crystal panels 1, respectively, whereby a green image and a blue image are formed. At this time, the pixels of the liquid crystal panel 1 of the liquid crystal light bulb 25 are subjected to a switching operation with a driving circuit operated based on a green image signal, and the pixels of the liquid crystal panel 1 of the liquid crystal light bulb 26 are subjected to a switching operation with a driving circuit operated based on a blue image signal.

According to the operation, the red light, the green light and the blue light are modulated by the liquid crystal bulbs 24, 25 and 26, respectively, to form a red image, a green image and a blue image.

The red image formed by the liquid crystal light bulb 24, i.e., the red light from the liquid crystal light bulb 24, is incident on the dichroic prism 21 from the plane 213, reflected left in FIG. 5 by the dichroic mirror surface 211, transmitted through the dichroic mirror surface 212, and emitted from the emission surface 216.

The green image formed by the liquid crystal light bulb 25, i.e., the green light from the liquid crystal light bulb 25, is incident on the dichroic prism 21 from the plane 214, transmitted through the dichroic mirror surfaces 211 and 212, and emitted from the emission surface 216.

The blue image formed by the liquid crystal light bulb 26, i.e., the blue light from the liquid crystal light bulb 26, is incident on the dichroic prism 21 from the plane 215, reflected left in FIG. 5 by the dichroic mirror surface 212, transmitted through the dichroic mirror surface 211, and emitted from the emission surface 216.

Accordingly, the light of the colors from the liquid crystal light bulbs 24, 25 and 26, i.e., the images formed by the liquid crystal light bulbs 24, 25 and 26, are synthesized by the dichroic prism 21 to form a color image. The image is projected (expanded projection) on the screen 320 disposed at a prescribed position by the projection lens 22.

The projection type display device 300 of the embodiment described herein has three liquid crystal panel, and the liquid crystal panel 1 is applied to all the liquid crystal panels, but it is sufficient that at least one of the liquid crystal panels is the liquid crystal panel 1. In this case, it is preferred that the liquid crystal panel 1 is applied to the blue liquid crystal light bulb.

Examples of the electronic apparatus of the invention include, in addition to the projection type display device shown in FIG. 5, a personal computer (mobile personal computer), a mobile phone (including the PHS system), a digital camera, a television set, a video camera, a viewfinder type or direct-view monitor type video tape recorder, a car navigation system, a pager, an electronic personal organizer (including one having communication facility), an electronic dictionary, an electronic calculator, an electronic game machine, a word processor, a work station, a videophone, a security television monitor, electronic binoculars, a POS terminal, an apparatus equipped with a touch-sensitive panel (such as a cash dispenser of banking establishments, and an automatic ticket vending machine), a medical equipment (such as an electronic clinical thermometer, a blood pressure meter, a blood glucose meter, an electrocardiogram display apparatus, an ultrasonic diagnostic equipment and a display device for an endoscope), a fish detector, various measuring instruments, a measuring instrument meter (such as measuring instrument meters of vehicles, boats and ships, and aircraft), and a flight simulator. The invention can be applied to a liquid crystal panel contained in a display part and a monitor part of these kinds of electronic apparatus.

The liquid crystal panel, the method for producing the liquid crystal panel, and the electronic apparatus, according to the invention have been described with reference to the embodiments shown in the figures, but the invention is not construed as being limited thereto.

For example, in the liquid crystal panel and the electronic apparatus according to the invention, each constitutional component may be replaced by an arbitrary constitutional component exerting the same function, and an arbitrary constitutional component may be added.

In the method for producing a liquid crystal panel according to the invention, arbitrary one or more steps may be added.

EXAMPLE

The invention will be described in more detail with reference to examples.

1. Production of Liquid Crystal Panel

Example 1

(1) A TFT substrate shown in FIG. 1 was prepared and set in the chamber of the vacuum deposition apparatus shown in FIG. 3 to make an angle $\theta_1$ of the substrate surface with respect to the vapor deposition source of 50'. The slit plate had a thickness of 1.5 cm and a slit width of 2.0 cm, the vapor deposition angle $\theta_2$ was 60°, the vapor deposition distance was 1.5 mm, and the running speed (moving speed) of the substrate was 2.5 cm/min.

The chamber was depressurized ($1\times10^{-4}$ Pa), and the TFT substrate having an inorganic oriented film was produced by oblique vapor deposition of $SiO_2$ at a substrate temperature of 110° C. and a vapor deposition rate of 10 Å/sec.

The resulting inorganic oriented film had fine pores having an angle of about 70° with respect to the upper surface of the TFT substrate, an average thickness of 45 nm, and an average opening diameter of 0.003 μm.

The area ratio $S_2/S_1$ of the surface area $S_2$ of the inorganic oriented film and the surface area $S_1$ of the TFT substrate was 2.85.

The measurement of the surface areas was carried out in the following manner. A TFT substrate having an inorganic oriented film, which had been produced in the same manner as above, was cut into a prescribe size (1.5 cm×1.8 cm), and five cut pieces were encapsulated in test tubes, respectively, and were measured for surface area by using a high accuracy full automatic gas adsorption apparatus (BELSORP 36, produced by Bel Japan, Inc.).

Specifically, the interior of the test tube having the cut piece encapsulated therein was replaced with helium gas, and then evacuated to vacuum at 100° C. Krypton gas was adsorbed on the entire cut piece including the inorganic oriented film at an adsorption temperature of 77 K (liquid nitrogen temperature). The measurement range was a relative pressure (P/PO) of from 0.0 to 0.4 and an equilibrium time of 180 seconds for each equilibrium relative pressure. The BET theory was applied to the measurement of surface areas. The geometrical surface area s of the part having no inorganic oriented film formed was subtracted from the surface area S of the entire cut surface to calculate the surface area $S_2$ of the inorganic oriented film.

The TFT substrate before forming an inorganic oriented film was measured for the surface area $S_1$ in the same manner.

The area ratio $S_2/S_1$ was calculated based on the values $S_1$ and $S_2$ thus measured.

(2) Subsequently, the TFT substrate having an inorganic oriented film was heated to 200° C. for 90 minutes in a clean oven, and immediately after completing the heating operation, the TFT substrate was moved to a dry nitrogen atmosphere and allowed to stand there.

(3) Subsequently, the inorganic oriented film was irradiated with an ultraviolet ray having a wavelength of 254 nm and an intensity of 30 mW/cm² for 10 minutes.

(4) Subsequently, the substrate having the inorganic oriented film was conveyed into the treating apparatus shown in FIG. 4 and set in the vessel (formed of polytetrafluoroethylene) with the inorganic oriented film made upward, followed by closing the chamber.

Ultrapure water (rinsing liquid) having been prepared was fed to the vessel to immerse the substrate having the inorganic oriented film in the rinsing liquid. Thereafter, the interior of the chamber was depressurized to 133 Pa, and the state was maintained for 10 minutes. According to the operation, gas inside the fine pores of the inorganic oriented film was replaced by ultrapure water.

The temperature of ultrapure water was 30° C.

After returning the interior of the chamber to the atmospheric pressure, ultrapure water was discharged from the vessel. Thereafter, the substrate was heated to 200° C. for 90 minutes while the interior of the chamber was being depressurized. According to the operation, the inorganic oriented film was dried.

After completing the heating operation, the substrate was stood to cool with the depressurized condition maintained.

(5) Subsequently, 1-octanol (molecular weight: 130) having been prepared was filtered to remove ionic impurities, and then subjected to nitrogen bubbling to remove a trace amount of water.

The gas inside the fine pores of the inorganic oriented film was replaced by 1-octanol in the same manner as in the step (3) by using the treating apparatus shown in FIG. 4.

Subsequently, after returning the interior of the chamber to the atmospheric pressure, 1-octanol was discharged from the vessel. Thereafter, the substrate was heated to 150° C. for 1 hour while the interior of the chamber was being depressurized to 133 Pa. According to the operation, 1-octanol was chemically bonded to the surface of the inorganic oriented film and the inner surfaces of the fine pores.

After completing the heating operation, the substrate was stood to cool with the depressurized condition maintained.

(6) Separately, a counter substrate for a liquid crystal panel shown in FIG. 1 was prepared, and a counter substrate for a liquid crystal panel having an inorganic oriented film was produced in the same manner as in the aforementioned steps (1) to (5) except that 2-propanol (molecular weight: 60) was used instead of 1-octanol.

(7) Subsequently, 3-glycidoxypropyltrimethoxysilane (molecular weight: 220) as a filling material (filling material composition) was fed along the outer periphery of the inorganic oriented films by an ink-jet printing method to fill the fine pores and to cover the surface. The average thickness thereof on the part covering the surface of the inorganic oriented film was 5 nm.

The viscosity of the filling material composition was 3 cP.

(8) A thermosetting adhesive (ML3804P, produced by Nippon Kayaku Co., Ltd.) was printed on the part having 3-glycidoxypropyltrimethoxysilane fed thereto with a part for an injection inlet remaining unprinted, and then heated to 80° C. for 10 minutes to remove the solvent.

The thermosetting adhesive was an epoxy resin having silica balls having a diameter of about 3 μm mixed therein, and had a viscosity of about 25,000 cP.

(9) Subsequently, the two substrates were superimposed under pressure with the inorganic oriented films inward, and adhered by heating at 140° C. for 1 hour. The two substrates were disposed in such a manner that the orientation directions of the inorganic oriented films formed an angle of 180°.

(10) Subsequently, a fluorine series liquid crystal having a negative dielectric constant (MLC-6610, produced by Merck & Co., Inc.) was injected into an inner space formed by adhering the two substrates from the injection inlet by a vacuum injection method.

(11) Subsequently, the injection inlet was sealed with an acrylic UV adhesive (LPD-204, produced by Henkel Japan, Ltd.) which was cured by irradiating with an ultraviolet ray having a wavelength of 365 nm at 3,000 mJ/cm$^2$.

The liquid crystal panel was thus produced in the aforementioned manner.

Example 2

A liquid crystal panel was produced in the same manner as in Example 1 except that a mixture of 2-(3,4-epoxycyclohexyl)ethyltrimethoxysilane (molecular weight: 246) and an ethylene-vinyl acetate copolymer was used as the filling material.

The mixing ratio of 2-(3,4-epoxycyclohexyl)ethyltrimethoxysilane/ethylene-vinyl acetate copolymer was 70/30 by weight.

The mixture was dissolved to prepare a filling material composition, which was fed to the inorganic oriented films by an ink-jet printing method.

The viscosity of the filling material composition was 20 cP.

Comparative Example

A liquid crystal panel was produced in the same manner as in Example 1 except that the filling material to be filled was omitted.

2. Durability Test of Liquid Crystal Panels

The liquid crystal panels produced in Examples and Comparative Example were allowed to stand in a high temperature and high humidity condition (80° C., 80% RH), and the display performance was confirmed with the lapse of time to measure the period of time until display abnormality occurred.

As a result, it was confirmed that the periods of time until display abnormality occurred in the liquid crystal panels produced in Examples were distinctly longer than the period of time until display abnormality occurred in the liquid crystal panel produced in Comparative Example.

A TFT substrate having an inorganic oriented film and a counter substrate for a liquid crystal panel having an inorganic oriented film were produced in the same manner as above except that Al$_2$O$_3$ was used instead of SiO$_2$, and a liquid crystal panel was produced therewith. The liquid crystal panel was evaluated in the same manner as above, and the similar results as above were obtained.

The entire disclosure of Japanese Patent Application No. 2005-298463, filed Oct. 13, 2005 is expressly incorporated by reference herein.

What is claimed is:

1. A liquid crystal panel comprising:
   a pair of substrates;
   inorganic oriented films having plural fine pores being provided on surfaces of the substrates facing each other;
   a liquid crystal layer being provided between the inorganic oriented films; and
   a sealing part sealing the liquid crystal layer, the sealing part being provided between the inorganic oriented films and along an outer periphery of the inorganic oriented films,
   the liquid crystal panel further comprising a filling material including a compound having a first functional group having high affinity with the inorganic oriented films and a second functional group having high affinity with the sealing part, the filling material being filled in an area of the inorganic oriented films overlapping the sealing part to fill the fine pores and to covers surfaces of the inorganic oriented films.

2. The liquid crystal panel according to claim 1, wherein the first functional group is a group forming a covalent bond with the inorganic oriented films.

3. The liquid crystal panel according to claim 2, wherein the inorganic oriented film is constituted by SiO$_2$ or Al$_2$O$_3$ as a major component, and the first functional group is an alkylsilyl group or a hydroxyl group.

4. The liquid crystal panel according to claim 1, wherein the inorganic oriented film is an obliquely vapor-deposited film.

5. The liquid crystal panel according to claim 1, wherein the second functional group is a group forming a covalent bond with the sealing part.

6. The liquid crystal panel according to claim 5, wherein the sealing part is constituted by a resin material having a polymerizable group as a major component, and the second functional group is a group being polymerized with the polymerizable group.

7. The liquid crystal panel according to claim 1, wherein a content of the compound in the filling material is 50% by weight or more.

8. The liquid crystal panel according to claim 1, wherein the compound has an average molecular weight of from 100 to 500.

9. A method for producing a liquid crystal panel comprising a pair of substrates; inorganic oriented films having plural fine pores being provided on surfaces of the substrates facing each other; a liquid crystal layer being provided between the inorganic oriented films; and a sealing part sealing the liquid crystal layer, the sealing part being provided between the inorganic oriented films and along an outer periphery of the inorganic oriented films,
   the method comprising the steps of:
   preparing a pair of substrates each having on one surface thereof the inorganic oriented film;
   filling a filling material including a compound having a first functional group having high affinity with the inorganic oriented films and a second functional group having high affinity with the sealing part, in an outer periphery of the inorganic oriented films to fill the fine pores and to covers surfaces of the inorganic oriented films;
   feeding a sealing material in a liquid state forming the sealing part to an area of the inorganic oriented films having been filled with the filling material;
   hardening the sealing material after disposing the pair of substrate with a gap therebetween to make the sealing materials in contact with each other;
   forming the liquid crystal layer by injecting a liquid crystal composition into the gap; and
   sealing an injection inlet having been used for injecting the liquid crystal composition.

10. The method for producing a liquid crystal panel according to claim 9, wherein the step of filling the filling material is carried out by feeding a filling material composition containing the filling material to the inorganic oriented films.

11. The method for producing a liquid crystal panel according to claim 10, wherein the filling material composition has a viscosity that is lower than a viscosity of the sealing material.

12. An electronic apparatus comprising the liquid crystal panel according to claim 1.

* * * * *